United States Patent [19]

Hoy et al.

[11] Patent Number: 5,583,923
[45] Date of Patent: Dec. 10, 1996

[54] TELEPHONY NETWORK HAVING NO-RING TELEMETRY CALL ABORTED IN FAVOR OF INCOMING TELEPHONY CALLS

[75] Inventors: Michael D. Hoy; Keith E. Nolde, both of Ipswich, England

[73] Assignee: British Telecommunications public limited company, London, England

[21] Appl. No.: 277,078

[22] Filed: Jul. 19, 1994

[30] Foreign Application Priority Data

Apr. 13, 1994 [EP] European Pat. Off. .............. 94302620

[51] Int. Cl.⁶ .................................................. H04M 11/00
[52] U.S. Cl. ............................................ 379/106; 379/201
[58] Field of Search ................................... 379/107, 106, 379/208, 243, 244, 246, 201, 104, 105, 102

[56] References Cited

U.S. PATENT DOCUMENTS 5,189,694  2/1993  Garland .................................... 379/106
5,327,488  7/1994  Garland .................................... 379/106
5,359,641  10/1994  Schull et al. ............................ 379/106

FOREIGN PATENT DOCUMENTS 199950  2/1992  Taiwan .

*Primary Examiner*—Wing F. Chan
*Attorney, Agent, or Firm*—Nixon & Vanderhye P.C.

[57] ABSTRACT

A telecommunications network including a number of digital main switching units connected to local switching units which provide telephony service to consumer premises via local connections provide telemetry services for utilities by way of a telemetry platform. A network management system is responsive to customer service information to cause local switching units to provide customer facilities such as call barring. The local exchange is responsive to signals indicative of a call from the telemetry platform to override any class of service which would normally prevent the telemetry call from being connected. The local exchange and telemetry platform co-operate with customer premises interface equipment to ensure that any conflict between telephony requirement and telemetry requirement is resolved in favor of the telephony customer.

6 Claims, 3 Drawing Sheets

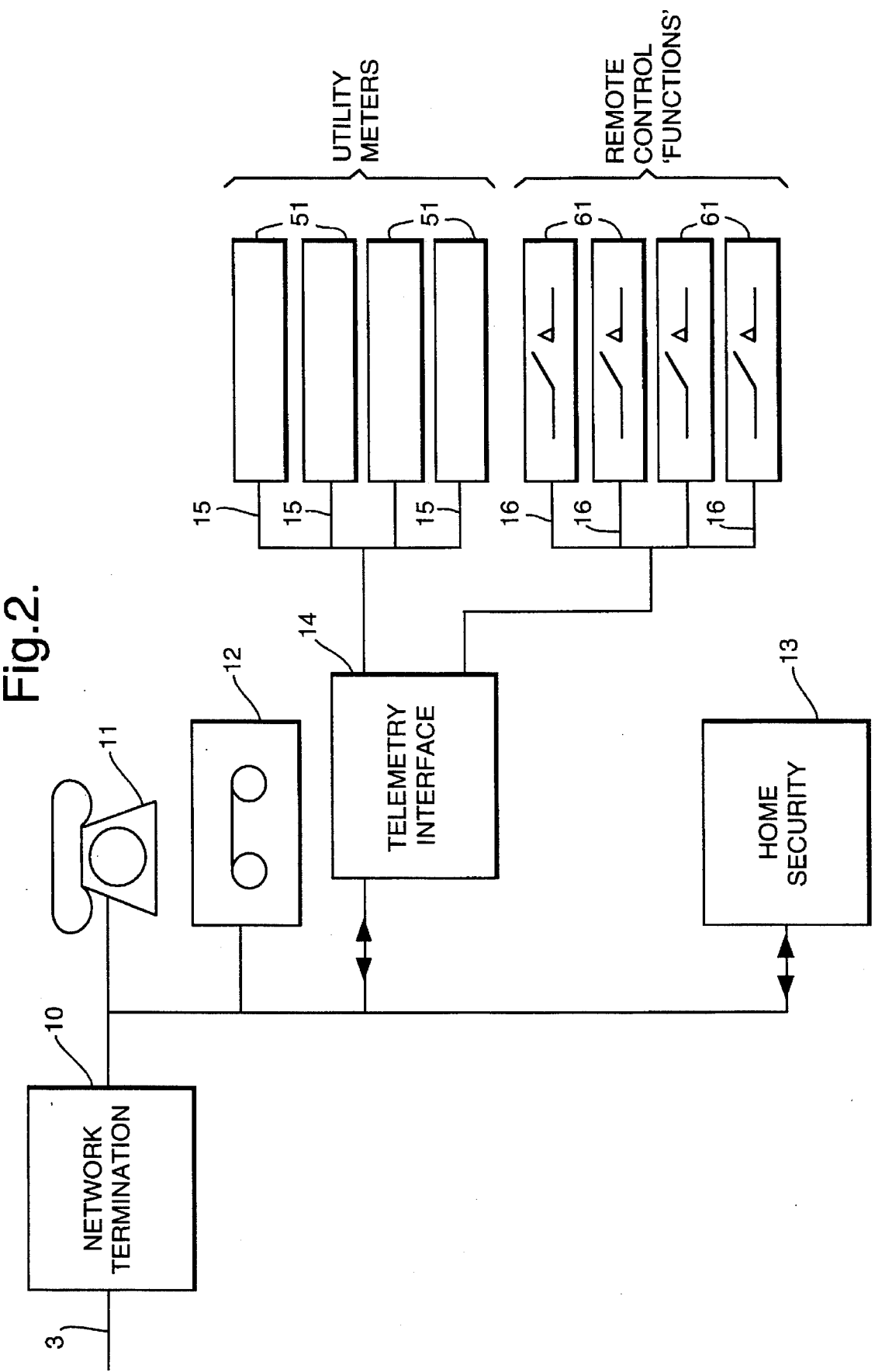

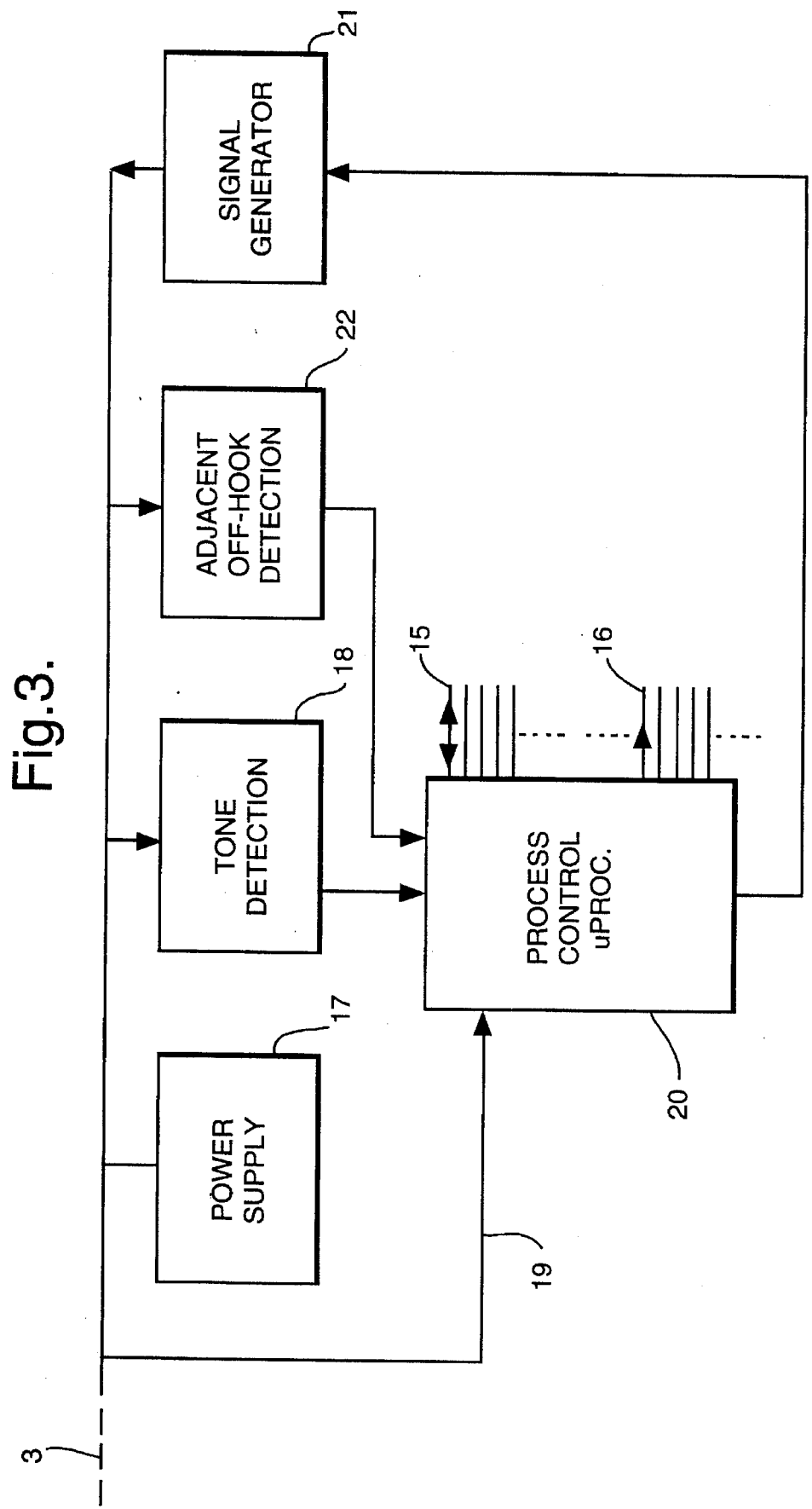

TELEPHONY NETWORK HAVING NO-RING TELEMETRY CALL ABORTED IN FAVOR OF INCOMING TELEPHONY CALLS

BACKGROUND OF THE INVENTION

1. Field of the Invention

The present invention relates to telecommunications networks and in particular to telephone networks including facilities for carrying out, telemetry or remote control functions.

2. Related Art

The cost to utility companies, such as gas, electricity and water suppliers, of manually reading meters is substantial. Consequently, meters are read infrequently and householders frequently receive estimated accounts rather than those based on actual consumption. Further difficulty can arise where meter readers are unable to obtain access.

Thus, remote meter reading is desirable although the high capital cost of installing a communications network specifically to read utility meters, particularly retrospectively, may not be justified. In the past, some remote controlled operations have been carried out using dedicated telephone links through public switched telephone networks. However, such usage of dedicated telephone numbers for use say once a month could not be justified.

Accordingly proposals have been put forward by the present applicant and others to use existing telephone network connections to customer premises to carry out various remote control and/or telemetry tasks. One problem with such proposals is that such usage of the telephone network could adversely affect network telephony traffic or other services offered over the network. For example there may be regulatory requirements regarding availability for telephone calls. Also, if there are tariff differentials between network uses for different purposes, a network operator will wish to give priority to the network use which generates the higher revenue. Also calls such as telemetry calls will normally be less time sensitive and therefore of lower priority than, say, a telephone call which may relate to potentially life-threatening circumstances.

SUMMARY OF THE INVENTION

According to a first aspect of the present invention there is provided a telecommunications switching network including a multiplicity of connections to consumers premises, at least some of said connections being co-terminated by both telecommunications apparatus and telemetry interface means, the network providing a first alert signal to cause the telecommunications apparatus to respond and a second, different alert signal, to cause the telemetry interface to respond characterised in that the switching network includes control means responsive to network signals indicating a telecommunications call attempt to force release any telemetry call then in progress.

According to a feature of the first aspect of the invention, the telemetry interface is responsive to a change in line characterisation indicating attempted operation of co-terminated telecommunications apparatus to forward signals to the switching network to cause any telemetry call in progress to be aborted.

According to a second aspect of the present invention there is provided a telephone switching network including a multiplicity of connections to consumers premises, at least some of said connections being co-terminated by both telephony apparatus and telemetry interface means, characterised in that the switching network includes control means responsive to signals indicative of telemetry call to override any class of service indicating barring of incoming calls to the telephony apparatus.

In this specification, the term "telemetry interface" is used to refer to an interface which is associated with utility meter(s) and/or other devices such as heating systems, electrical apparatus etc. which are subject to remote control. If there is to be no reading of utility meters the interface may not, strictly speaking, be facilitating any telemetry (i.e. remote reading) but nevertheless, the interface is still referred to as a "telemetry interface".

BRIEF DESCRIPTION OF DRAWINGS

A telephone network in accordance with the invention will now be described by way of example with reference to the accompanying drawings of which:

FIG. 2 is a schematic diagram of an embodiment of a consumer premises installation in the network of FIG. 1; and FIG. 3 is a schematic diagram of an embodiment of the telemetry interface of FIG. 2.

BRIEF DESCRIPTION OF EXEMPLARY EMBODIMENTS

Figure 1:
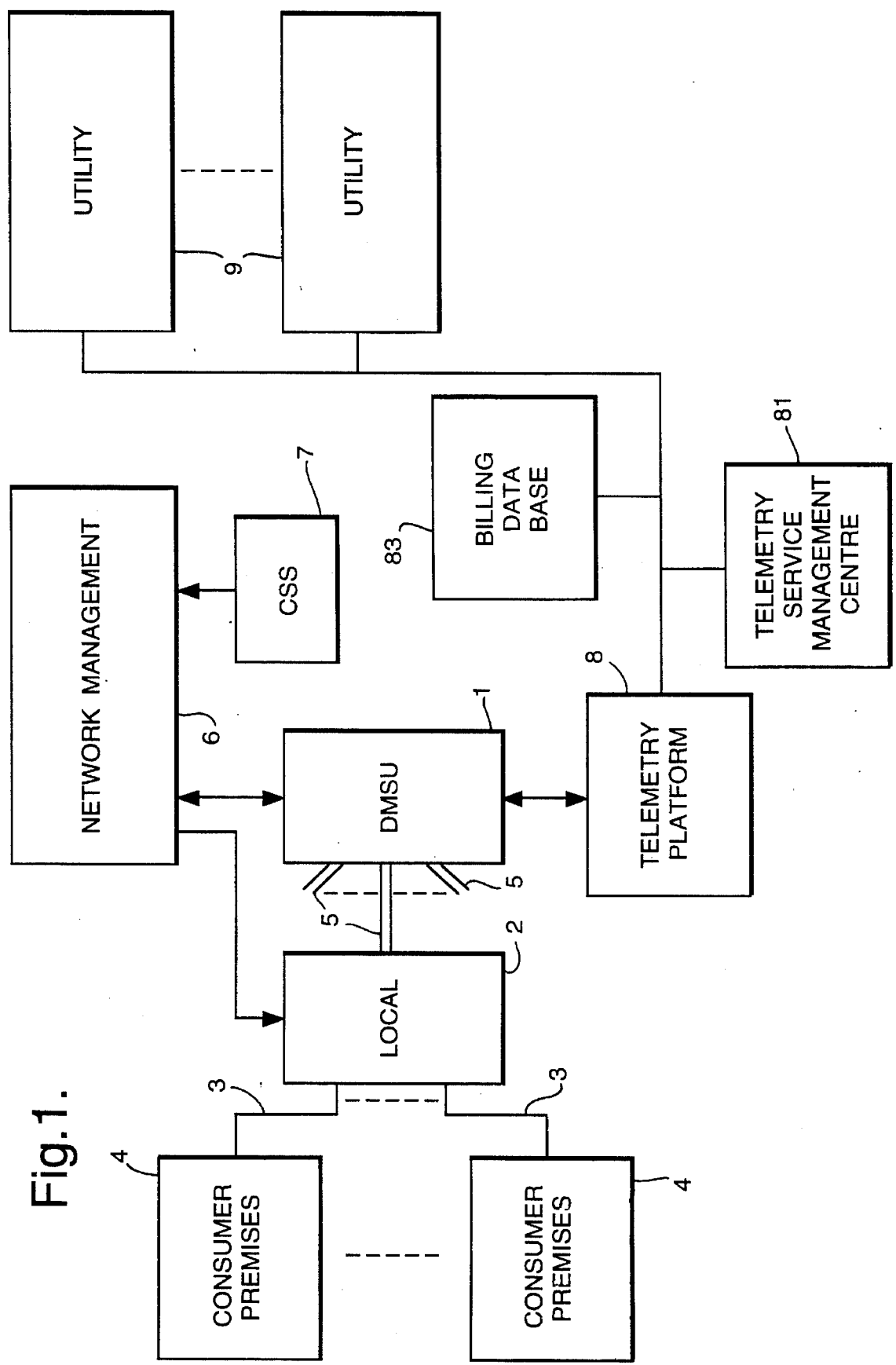
FIG. 1 is a schematic diagram of a telecommunications network according to one embodiment of the invention.

Referring to FIG. 1, in a typical public switched telephone network (PSTN) operating in a digital switching environment there will be a number of digital main switching units 1 (DMSU) (only one of which is shown) fully interconnected to provide full switching capability. Each DMSU 1 is connected by way of a digital network 5 to a number of local exchange units 2 which supply telephony service via local network connections 3 to consumer premises 4.

Each of the local exchange units 2 is responsive to a Network Management control system 6 to set up telephone calls, determine facilities available to consumers and to effect billing and other services. The Network Management system 6 will have input from customer service records system 7 to determine (for example) whether incoming or outgoing calls are permitted to particular consumer premises. Records system 7 also records the presence of telemetry service for each consumer line, and keeps records updated, logs faults and contacts the customer when these are cleared. The Network Management System 6 also influences the operation of the DMSUs 1.

Telemetry service platform 8 can operate on behalf of utilities 9 (e.g. gas/electric/water companies) to effect remote readings of utility meters located at consumer premises 4. Telemetry platform 8 can be instructed to "read" a number of meters in different premises 4 and subsequently forward a "batched" report of the meter readings. Telemetry platform 8 is a stand-alone platform in the network, which has the ability to control the initiation of telemetry or other remote control calls, and can perform the necessary associated functions, such as scheduling and traffic management. The telemetry platform communicates with a telemetry service management system 81 (TSMS) which carries data requirements for remote meter reading/function control.

TSMS 81 incorporates the following data elements:

consumer reference number;

directory number—so that calls from a consumer's premises can be routed to the utility across the network;

updated automatically with consumer changes by customer service records 7;

utility data—enabling a check of which utility is responsible for a particular consumer's meter (51);

type of telemetry interface 14 (FIGS. 2, 3)—TSMS 81 needs to instruct platform 8 how to access different types of interface, together with information on appropriate 'wake up' tones;

telemetry interface address/port number—the platform 8 will need this to complete the call set-up phase with an interface 14;

interface owner—may be the network operator, the utility or a separate company—will be sent fault reports in the event of failure of an interface 14;

security component—the link from the platform 8 to an interface 14 may require an authentication process or encryption;

billing address—instructs TSMS 81 where to direct the meter reading.

TSMS 81 may also maintain data on consumers for bulk read operations. This could be held against each consumer's record or could be stored as a list in the TSMS. TSMS 81 will also record the message, supplied by the utility or other 'owner' of meters 51 or remote control devices 61, which is to be sent to the meter/device as part of the reading/control operation.

TSMS81 has a number of functions:

receives new customer enrolment and cessation requests for telemetry/remote functions;

maintains a failed call log;

provides billing information to billing database 83;

monitors quality of service;

maintains archive data for an agreed interval;

receives and processes results from the telemetry platform 8 and returns results to the utilities 9 together with their customer references or telemetry interface 14 identity information;

maintains details of "wake up" tones for each interface 14.

FIG. 2 shows an installation in a consumer's premises 4. Referring to FIG. 2, connected to the line 3 by way of a suitable network termination 10 a customer may have normal telephony apparatus such as telephone 11 and answering machine 12, and other apparatus for telecommunications services such as a modem for a personal computer or facsimile transmission apparatus (not shown).

Other functions which share the telephone line 3 may include home security apparatus 13 which provides connection to remote monitoring stations if (e.g.) fire detectors or intruder detectors are in use.

In addition, the consumer premises has a telemetry interface 14 which has connections 15 to interface circuits of gas, electricity or water meters 51 for example and also connections 16 to switching controls 61 for use in remote operations such as switching on and off heating systems and the like.

The telemetry interface 14 monitors the line 3 for a "wake-up" tone dedicated to telemetry operation. Further detail of the monitoring may be obtained by reference to our co-pending European Patent application no (A24784) filed on Apr. 13, 1994.

The telemetry interface 14 does not require ringing current to be supplied from the exchange (2 of FIG. 1) so that other telephony apparatus 11, 12 is not affected by telemetry calls set up through the network. Thus meter reading can occur without the consumer's knowledge or disturbance. Calls controlled by interface 14 are referred to as "no ring" calls, since they occur with no call arrival indication (e.g. ringing current) to the consumer.

FIG. 3 is a block schematic diagram of telemetry interface 14. Thus, referring to FIG. 3, within the telemetry interface 14 a power supply 17 may draw power from the telephone line 3 to operate other circuits including a tone detection circuit 18. The tone detection circuit 18 is tuned to a particular frequency or frequencies to monitor the line 3 for a "wake-up" tone. If a wake up tone is detected then the tone detector forwards an interrupt signal to a microprocessor 20 causing it to commence telemetry operation.

By way of an input 19 the microprocessor receives subsequent tones from the line 3 to cause it either to forward operating signals to the connections 16 to various remote control functions 61 or to forward a request signal to utility meters 51 by way of connections 15.

If signals are to be returned from utility meters to the telemetry platform (8 of FIG. 1), the microprocessor 20 receives data by way of connections 15 and forwards the data by way of a signal generator 21 to the telephone line 3.

An impedance detection circuit 22 is also provided in the telemetry unit. If this circuit detects a change in line impedance (or line voltage) indicative of other apparatus (e.g. telephone 11, security unit 13) looping the line then it causes the signal generator 21 to remove a pre-determined indication of presence (for example a channel tone) from the line 3 which causes the telemetry platform 8 (of FIG. 1) to abort its connection through the network to the consumer's premises 4. Thus telemetry operations do not take place if there is an alternative requirement for line usage at the consumer premises 4 and telemetry operations remain transparent to the telephony customer.

Referring again to FIG. 1, while a telemetry call is in progress, if the local exchange unit 2 receives a network signal indicative of an incoming telephone call for consumers premises 4, it will cause the telemetry connection to be abandoned and will signal the telemetry platform 8 accordingly such that normal telephony will occur again maintaining transparency of the telemetry operation.

The process of operation of the embodiment of the invention illustrated in the drawings will now be described in more detail.

TSMS 81 initiates a meter read operation in line with a utility's requirement. This may be a pre-specified bulk read of an identified group of that utility's customers. As indicated above, the TSMS 81 may have these customers' records marked accordingly.

Telemetry platform 8 completes the calls to the interfaces 14. It receives telemetry requests from TSMS 81 together with the information needed to complete the call—i.e. the consumers' directory numbers, wake-up tones etc. For each telemetry call to be made, a no-ring call request is made to DMSU 1 via CCITT Signalling System No. 7 (C7) in conjunction with a pre-determined embedded protocol.

In the event that the line is already engaged (i.e. an 'off hook', looped or engaged status is detected) then the request is not accepted and a signalling message is returned, causing the platform 8 to reschedule the call and re-try later. Rescheduling and re-trying will then occur up to a specified maximum number of times—e.g. two re-tries the same night followed by a number of consecutive night-time attempts, and finally a day-time attempt.

The local exchange 2 is arranged so as to override a range of network services such as call diversion and call barring.

Once an answer indication is received by the local exchange unit 2 from the interface 14, a normal speech path is established between the telemetry platform 8 and the interface 14. The local exchange will clear the call in the normal way on receipt of a request from the telephony platform, or if the call is timed-out, or in the event of another incoming or outgoing call. It is noted that the answer indication may be establishment of a loop condition or by predetermined in band tone signalling such as DTMF signalling.

The no-ring call needs to occur without interfering with the consumer's other telecommunications services in any way. Therefore a consumer needs to be able to make and receive incoming or outgoing calls. Incoming callers should hear ringing tone during a call attempt, even if a no-ring call is then occurring, and the consumer should hear dial tone whenever he wants to initiate a call.

A no-ring call of the kind which causes a loop answered condition prevents the local exchange 2 from recognising a call attempt by the telephony customer. Thus the telemetry platform 8 monitors the signal level of the data channel during the no-ring call. If there is a drop in the signal level—typically around 4 dB, this is indicative of such a call attempt. The platform then sends a priority force release message to the local exchange 2 to release the no-ring call. The priority force release signalling message (using CCITT No 7 signalling as referred to above) also instructs the local exchange unit 2 to maintain the connection to the consumers premises 4 and to supply dial tone to the line 3. TSMS 81 is notified to re-try the no-ring call at a later time.

It will be appreciated that in certain circumstances calls to specific consumer's premises 4 are not permitted. Thus, during customer absence for example, a request for temporary call barring may be placed. Such information is available to the Local Exchange 2 by virtue of periodic updating from the Network Management System 6 and is normally known as class of service information.

On request for a call set up, the local exchange 2 will consult the class of service information and, if that information indicates that calls are not permitted, will prevent establishment of a call through the network. However, if the call is for remote meter reading for example, the local unit will override the class of service restriction and cause a no-ring call to be established for that purpose. Calls for service for other purposes (e.g. for remote operation) may still remain barred.

We claim:

1. A telephone switching network including:

a multiplicity of connections to consumers premises, at least some of said connections being co-terminated by both telephony apparatus and a telemetry interface, means for providing a first kind of alert signal to cause the telephony apparatus to respond and a second, different alert signal, to cause the telemetry interface to respond, and control means responsive to network signals indicating an incoming telephone call attempt to a customers premises to force release of any telemetry call to the same customers premises then in progress.

2. A telephone switching network as in claim 1 wherein the switching network further includes means responsive to signals from the telemetry interface located at the customers premises to force release of any telemetry call then in progress thereat in favor of an outgoing telephony call from such customers premises.

3. A method for operating a telecommunications system including an interconnected network of telecommunications switching units connected to selectively service consumer lines terminated with both a ringing telephone and a no-ring telemetry interface, said method comprising:

detecting an incoming telephone call directed toward a particular customer line from elsewhere in the network, and aborting an ongoing telemetry call on said particular customer line in favor of the incoming telephone call being directed thereto.

4. A method as in claim 3 further comprising:

detecting a local off-hook telephone condition on a particular customer line, and aborting an ongoing telemetry call on said particular customer line in favor of an attempted outgoing telephone call thereon.

5. A telecommunications system comprising:

an interconnected network of telecommunications switching units connected to selectively service consumer lines, terminated with both a ringing telephone and a no-ring telemetry interface; and at least one of said switching units including means for detecting an incoming telephone call directed toward a particular customer line from elsewhere in the network and for aborting an ongoing telemetry call on said particular customer line in favor of the incoming telephone call being directed thereto.

6. A telecommunications system as in claim 5 wherein:

said no-ring telemetry interface includes means for detecting a local off-hook telephone condition and for aborting an ongoing telemetry call on its associated customer line in favor of an attempted outgoing telephone call.

* * * * *